(12) United States Patent
Krüger et al.

(10) Patent No.: US 10,655,520 B2
(45) Date of Patent: May 19, 2020

(54) EXHAUST SYSTEM

(71) Applicant: Eberspächer Exhaust Technology GmbH & Co. KG, Neunkirchen (DE)

(72) Inventors: Jan Krüger, Neuhausen (DE); Günter Eberspach, Wolfschlugen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 16/059,443

(22) Filed: Aug. 9, 2018

(65) Prior Publication Data
US 2019/0055870 A1 Feb. 21, 2019

(30) Foreign Application Priority Data
Aug. 16, 2017 (DE) .......................... 10 2017 118 680

(51) Int. Cl.
| | | |
|---|---|---|
| *F01N 3/025* | (2006.01) | |
| *F01N 3/20* | (2006.01) | |
| *F01N 3/021* | (2006.01) | |
| *F01N 13/00* | (2010.01) | |
| *F01N 13/14* | (2010.01) | |
| *F01N 3/10* | (2006.01) | |

(Continued)

(52) U.S. Cl.
CPC ........... *F01N 3/2033* (2013.01); *F01N 3/021* (2013.01); *F01N 3/025* (2013.01); *F01N 3/103* (2013.01); *F01N 3/2066* (2013.01); *F01N 3/2889* (2013.01); *F01N 13/0097* (2014.06); *F01N 13/145* (2013.01); *F01N 3/035* (2013.01); *F01N 2240/02* (2013.01); *F01N 2240/14* (2013.01); *F01N 2470/24* (2013.01); *F01N 2610/03* (2013.01)

(58) Field of Classification Search
CPC ...... F01N 3/025; F01N 3/0205; F01N 3/0234; F01N 3/2033; F01N 3/2889; F01N 2240/02; F01N 2240/14
See application file for complete search history.

(56) References Cited

U.S. PATENT DOCUMENTS 4,557,108 A * 12/1985 Torimoto ................ F01N 3/025 55/283
4,677,823 A * 7/1987 Hardy .................... F01N 3/025 60/274

(Continued)

FOREIGN PATENT DOCUMENTS

| DE | 42 08 621 A1 | 9/1993 |
| DE | 195 30 966 A1 | 2/1997 |
| DE | 195 42 886 A1 | 5/1997 |

(Continued)

OTHER PUBLICATIONS

Machine translation of DE-202007006087-U1, accessed on Sep. 27, 2019. (Year: 2019).*

*Primary Examiner* — Jonathan R Matthias
(74) *Attorney, Agent, or Firm* — McGlew and Tuttle, P.C.

(57) ABSTRACT

An exhaust system for an internal combustion engine, especially in a vehicle, comprising at least one first catalytic converter unit (18) with at least one catalytic converter device (24), through which internal combustion engine exhaust gas can flow and a fuel-operated heater (36). The at least one first catalytic converter unit (18) comprises a heat exchanger volume (50) through which heater exhaust gas leaving the heater (36) can flow.

20 Claims, 1 Drawing Sheet

(51) Int. Cl.
*F01N 3/28* (2006.01)
*F01N 3/035* (2006.01)

(56) References Cited

U.S. PATENT DOCUMENTS

| | | | |
|---|---|---|---|
| 6,318,077 B1 * | 11/2001 | Claypole | F01N 3/006 60/303 |
| 2011/0138785 A1 * | 6/2011 | Birkby | F01N 3/025 60/286 |

FOREIGN PATENT DOCUMENTS

| | | | |
|---|---|---|---|
| DE | 200 21 484 U1 | 3/2001 | |
| DE | 101 11 787 A1 | 9/2001 | |
| DE | 102 11 115 A1 | 9/2003 | |
| DE | 202007006087 U1 * | 8/2007 | F01N 5/02 |
| DE | 10 2010 029262 A1 | 12/2011 | |
| JP | H09 125939 A | 5/1997 | |
| WO | 03/062005 A1 | 7/2003 | |

* cited by examiner

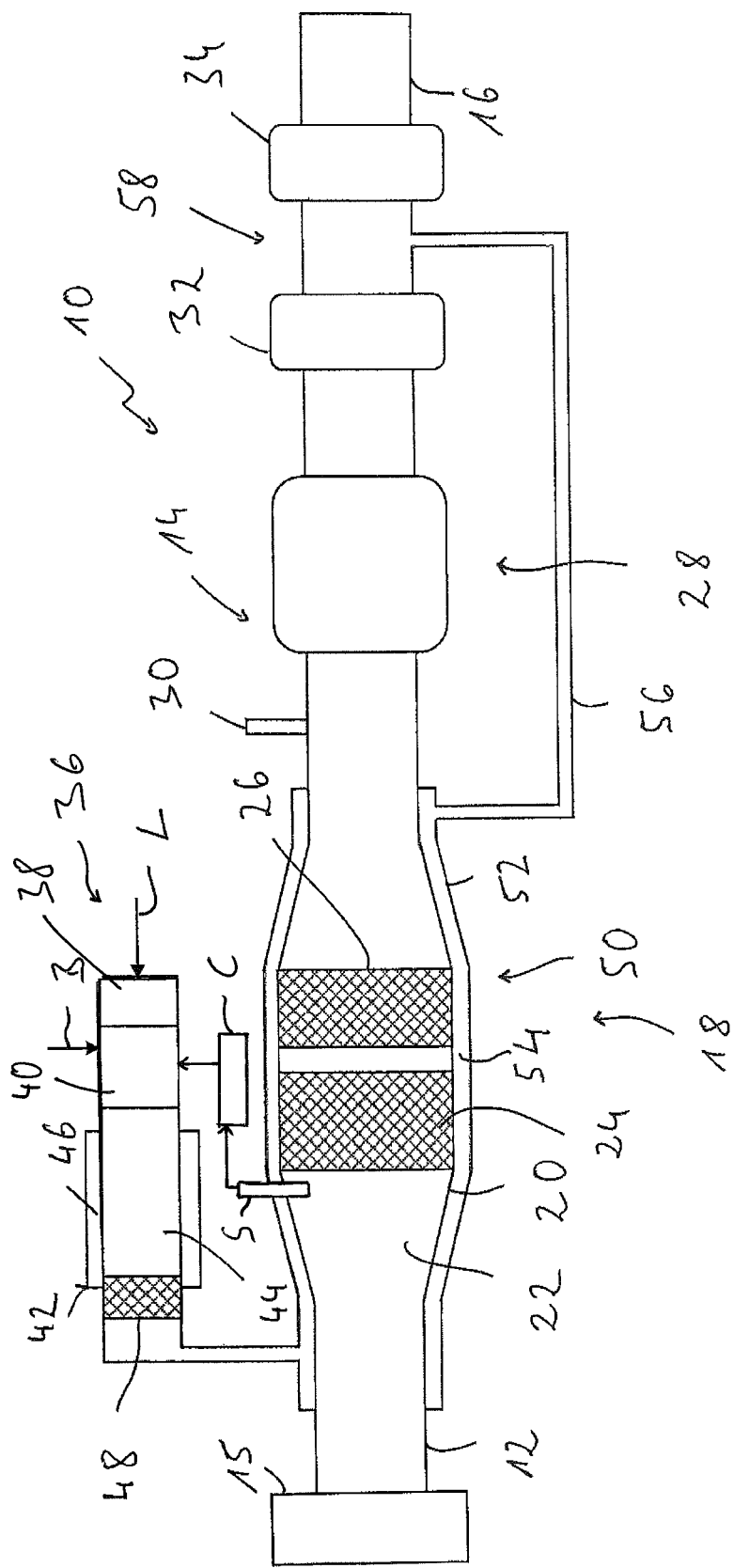

EXHAUST SYSTEM

CROSS REFERENCE TO RELATED APPLICATIONS

This application claims the benefit of priority under 35 U.S.C. § 119 of German Application 10 2017 118 680.8, filed Aug. 16, 2017, the entire contents of which are incorporated herein by reference.

FIELD

The present invention pertains to an exhaust system for an internal combustion engine which can be used, for example, to discharge to the surrounding area the internal combustion engine exhaust gas generated in an internal combustion engine used as a drive unit in a vehicle.

BACKGROUND

Such an exhaust system generally comprises one or more catalytic converter units. For example, a catalytic converter unit directly following the internal combustion engine in an internal combustion engine exhaust gas flow direction may be an oxidation catalytic converter device, following which may be, for example, a particle filter device. An SCR (selective catalytic reduction) catalytic converter unit may be arranged further downstream. Because such a catalytic converter unit, especially a catalytic converter unit comprising an oxidation catalytic converter device, shall have a defined minimum temperature of about 200° C. for an efficient catalytic reaction, the problem is basically that a comparatively long time may pass until the catalytic converter device reaches this minimum temperature or reaches it again after a start-up or restart of the internal combustion engine, for example, after a so-called coasting mode of a vehicle.

In order to shorten this time, it is, for example, possible to arrange the catalytic converter unit as close as possible to an internal combustion engine in order thus to keep the heat loss from internal combustion engine exhaust gas leaving the internal combustion engine as minimal as possible on the flow path to the catalytic converter unit. However, this is often achieved with difficulty only because of the available space for installation in vehicles. Furthermore, an electric heater may be associated with such a catalytic converter unit. This catalytic converter unit can be put into operation when the catalytic converter device of same has a temperature that is too low. However, the operation of such an electric heater leads to a comparatively high load on the vehicle electrical system. Further, it is known that the thermal insulation of such an exhaust system can be improved with comparatively high design effort in order to thus guarantee an as fast as possible heating of a catalytic converter device due to reduced dissipation of heat to the surrounding area. In addition to the high design effort and thus also related cost, such a thermal insulation leads to the problem that a longer operation of an internal combustion engine in a high state of load may lead to a thermal overload of a catalytic converter unit. The result of such a thermal overload may be that the housing of the catalytic converter unit carrying the catalytic converter device expands to a comparatively great extent, while a catalytic converter device, which is constructed with ceramic material and is held in the housing with insertion of a fiber mat, does not expand thermally or expands thermally with considerably less intensity. Because of lost clamping action in the housing, this may lead to a displacement of the catalytic converter device in the direction downstream to a funnel-like-shaped outlet area for the internal combustion engine exhaust gas. If the housing subsequently cools off, this may lead to an excessive radial load and damage to the catalytic converter device.

SUMMARY OF THE INVENTION

An object of the present invention is to provide an exhaust system for an internal combustion engine, especially in a vehicle, which exhaust system can be better controlled with respect to an exhaust system thermal state.

According to the present invention, this object is accomplished by an exhaust system for an internal combustion engine, especially in a vehicle, comprising at least one first catalytic converter unit with at least one catalytic converter device through which internal combustion engine exhaust gas can flow and a fuel-operated heater, wherein the at least one first catalytic converter unit comprises a heat exchanger volume through which heater exhaust gas leaving the heater can flow.

By means of a fuel-operated heater, which can be operated in a vehicle, for example, as a parking heater or/and as an auxiliary heater, exhaust gas with a temperature in the range of about 200° C. is discharged comparatively rapidly after the start-up of such a heater. According to the present invention, this exhaust gas is used to transmit heat in the heat exchanger volume to at least one catalytic converter device and to thus bring this catalytic converter device comparatively quickly to a temperature that guarantees the efficient performance of a catalytic reaction. For example, in a state, in which such a heater is operated as a parking heater before start-up of a vehicle, in order to preheat a vehicle interior or/and also to preheat an internal combustion engine used as a drive unit, the heater exhaust gas discharged from this heater can thus be used for the thermal treatment of at least one catalytic converter unit, to guarantee the carrying out of a catalytic reaction when the internal combustion engine is started during start-up of a vehicle even if the internal combustion engine exhaust gas is at first still comparatively cold. Even in case of the restart of an internal combustion engine, for example, after a long-lasting coasting mode of a vehicle, in which the internal combustion engine was switched off and thus the internal combustion engine and also the exhaust system are cooled off, a faster heating of a catalytic converter unit can be guaranteed due to the start-up of the heater. Because the internal combustion engine exhaust gas stream and the heater exhaust gas stream are guided separately from one another, especially in the area of the catalytic converter device to be thermally treated or upstream of same, because the heater exhaust gas is led through the heat exchanger volume through which internal combustion engine exhaust gas cannot flow, the pressure of the internal combustion engine exhaust gas has further no disadvantageous effect on the operation of the heater in the lines carrying this exhaust gas.

These principles of the present invention may apply in a vehicle, which is driven exclusively by an internal combustion engine, i.e., a diesel internal combustion engine or a spark ignition internal combustion engine. The present invention may also apply in a vehicle equipped with a hybrid drive system, in which an internal combustion engine (diesel or spark ignition) as well as one or more electric motors provide the necessary drive torque.

For a very efficient thermal interaction of the heater exhaust gas with the at least one first catalytic converter unit, it is proposed that the at least one first catalytic converter unit comprise an internal combustion engine exhaust gas flow space through which internal combustion engine exhaust gas can flow, wherein the at least one catalytic converter device is arranged in the internal combustion engine exhaust gas flow space, and that the heat exchanger volume comprise a heater exhaust gas flow space enclosing the internal combustion engine exhaust gas flow space in at least some areas. In particular, provisions may especially be made for the heater exhaust gas flow space to enclose at least the length area of the internal combustion engine exhaust gas flow space, which length area contains the at least one catalytic converter device, preferably over the entire circumference of the internal combustion engine exhaust gas flow space.

At least one catalytic converter device of the at least one first catalytic converter unit may be an oxidation catalytic converter device.

Above all, when used in conjunction with a diesel internal combustion engine, it is advantageous when the at least one first catalytic converter unit comprises at least one particle filter device which is arranged downstream of at least one catalytic converter device of same. In such a configuration, the heater exhaust gas flow space may enclose the length area of the internal combustion engine exhaust gas flow space, which length area contains the at least one particle filter device, preferably over the entire circumference of the internal combustion engine exhaust gas flow space.

For a more improved exhaust gas purification action, it is proposed that at least one second catalytic converter unit be provided in an internal combustion engine exhaust gas flow direction downstream of the at least one first catalytic converter unit. The at least one second catalytic converter unit may be an SCR catalytic converter unit.

In an especially advantageous variant of an exhaust system according to the present invention, at least one muffler unit may be provided in an internal combustion engine exhaust gas flow direction downstream of the at least one first catalytic converter unit. Here, the heater exhaust gas flowing through the heat exchanger volume in the internal combustion engine exhaust gas flow direction upstream of at least one muffler unit can be introduced into the internal combustion engine exhaust gas stream. The provision of a separate muffler for the heater can thus be dispensed with.

When a plurality of muffler units following one another in an internal combustion engine exhaust gas flow direction are provided, the heater exhaust gas is introduced into the internal combustion exhaust gas stream between a last muffler unit in the internal combustion engine exhaust gas flow direction and a next-to-last muffler unit in the internal combustion engine exhaust gas flow direction in an especially preferred embodiment. It is thus guaranteed that the heater exhaust gas is introduced into the exhaust system or a line area of same carrying the internal combustion engine exhaust gas in an area, in which the pressure of the internal combustion engine exhaust gas is already markedly reduced, so that a disadvantageous effect on the combustion operation of the heater does not occur. Nevertheless, in a state in which the heater is not operated, air can be suctioned through the heater and thus also through the heater exchanger volume due to the suction action generated by means of the internal combustion engine exhaust gas stream, so that an overheating of the at least one first catalytic converter unit can be counteracted.

The heater may comprise:
a combustion air feed device for feeding combustion air into a combustion chamber,
a fuel feed device for feeding fuel into the combustion chamber, and
a heat exchanger unit through which heater exhaust gas and heat exchanger medium to be heated can flow.

In order to also avoid an excessive content of harmful substances in the exhaust gas in the area of the heater, it is proposed that a heater exhaust gas catalytic converter device, through which heater exhaust gas can flow, be provided. Such a heater exhaust gas catalytic converter device, which may, for example, be configured as an oxidation catalytic converter as well, further offers the advantage that it brings about an additional heating of the heater exhaust gas flowing through the heater exhaust gas catalytic converter device because of the exothermal reaction taking place there during the operation of the heater with fuel excess, i.e., in a hypostoichiometric operating state, due to the reaction of unburned hydrocarbon and the heat developing in this connection. This effect can be used to raise the heater exhaust gas temperature to a value markedly above 200° C. and thus to heat the at least one first catalytic converter unit even more rapidly.

In order to create this effect as efficiently as possible, it is further proposed that the heater exhaust gas catalytic converter device be arranged in a heater exhaust gas flow direction which is essentially arranged downstream of the heat exchanger unit. It is thus guaranteed that heat developing during the catalytic reaction in the heater exhaust gas catalytic converter device is not transmitted in the heat exchanger unit to the heat carrier medium flowing through this heat exchanger unit, but rather is transported essentially through the heater exhaust gas in the direction towards the at least one first catalytic converter unit.

The present invention further pertains to a method for operating an exhaust system for an internal combustion engine configured according to the present invention, wherein the heater is operated in a catalytic converter unit temperature control mode at least if the temperature in the area of the at least one first catalytic converter unit is below a first threshold temperature in a combustion operation for generating heater exhaust gas flowing through the heat exchanger volume. This first threshold temperature may be, for example, in a range of 150° C. to 200° C.

In order to be able to further increase the temperature of the heater exhaust gas especially when using a heater exhaust gas catalytic converter device associated with the heater, it is proposed that the heater be operated at least some times with a hypostoichiometric fuel/combustion air mixture in the combustion operation.

In order to make available the oxygen necessary for the reaction at the heater exhaust gas catalytic converter device in this case, the heater may alternatingly be operated with a hypostoichiometric fuel/combustion air mixture and a hyperstoichiometric fuel/combustion air mixture.

In an alternative approach for providing reaction heat at the heater exhaust gas catalytic converter unit, it is proposed that the heater be operated at least some times with a hyperstoichiometric fuel/combustion air mixture after the combustion has ended.

Provisions may further be made in the method according to the present invention that the heater be operated in a catalytic converter unit temperature control mode at least if the temperature in the area of the at least one first catalytic converter unit is above a second threshold temperature in an air feed operation for generating an air stream flowing through the heat exchanger volume. By feeding air through the heater, which is not operated during the combustion operation, which air then also flows through the heater exchanger volume of the at least one first catalytic converter unit, heat can be removed and discharged to the outside especially when there is a risk of a thermal overload of this catalytic converter unit. The second threshold temperature may be in a range of 500° C. to 600° C.

It should be noted that the temperature values to be compared with such threshold temperatures are generated in a variety of ways. Thus, temperature sensors are associated with the system areas to be monitored thermally, for example, with a catalytic converter device, with a particle filter or a housing containing a catalytic converter device or a particle filter, in order to detect the temperature of these system areas to be monitored via a control unit (one or more processors) with respect to their temperature directly. The temperature of the internal combustion engine exhaust gas leaving the internal combustion engine is additionally detected according to another embodiment for example, directly before or directly after a catalytic converter device and based on this temperature, for example, the temperature of a catalytic converter device or/and the temperature of a housing containing or carrying the catalytic converter device can be inferred by the control unit. The temperatures present in the area of a catalytic converter unit, especially of a catalytic converter device or of a housing of same, are according to one embodiment inferred with computer models, for example, by taking into account the load state of an internal combustion engine and of the thermal behavior of an exhaust system, using the control unit with a memory (with one or more stored computer model).

The present invention further pertains to a drive system for a vehicle with an internal combustion engine and an exhaust system for the internal combustion engine according to the present invention, wherein this exhaust system may preferably be operated with a method according to the present invention.

The present invention will be described in detail below with reference to the attached FIGURE. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic diagram of an exhaust system configured according to the present invention.

DESCRIPTION OF PREFERRED EMBODIMENTS

Referring to the drawings, FIG. 1 shows a basic diagram of an exhaust system, which is generally designated by 10, for an internal combustion engine, for example, in a motor vehicle. The exhaust system 10 is configured with an upstream end area 12 of an exhaust gas line 14 comprising a plurality of exhaust gas pipes for connection to an internal combustion engine 15, for example, to an outlet elbow of same. In a downstream end area 16, the internal combustion engine exhaust gas discharged from the internal combustion engine 15 after flowing through the exhaust system 10 leaves the exhaust system 10 to the surrounding area. It should be noted here that, of course, the exhaust system 10 does not necessarily have to have the linearly elongated configuration, which can be seen in FIG. 1. The exhaust system 10 may also have one or more curved areas adapted to the structure of a vehicle.

For example, the exhaust system 10 may comprise a first catalytic converter unit 18 following the upstream end area 12. The first catalytic converter unit 18 comprises in a housing 20 an internal combustion engine exhaust gas flow space 22, in which internal combustion engine exhaust gas leaving the internal combustion engine 15 flows in the direction towards a catalytic converter device, which is generally designated by 24. The catalytic converter device 24 may, for example, be an oxidation catalytic converter device, which is held by press fit in the housing 20 of the catalytic converter unit 18 with a, e.g., ceramic block having a monolithic configuration and with a fiber mat enclosing this ceramic block. The ceramic block may be coated or/and interspersed with catalyst material.

A particle filter device 26 may be arranged downstream of the catalytic converter device 24 in the internal combustion engine exhaust gas flow space in the housing 20.

A second catalytic converter unit 28 may be provided downstream of the first catalytic converter unit 18. This second catalytic converter unit may be configured as a so-called SCR catalytic converter unit. A reactant, for example, a urea/water solution, can be added to the internal combustion engine exhaust gas by means of an injector 30 arranged upstream of the second catalytic converter device 28, so that the nitrogen oxide content in the internal combustion engine exhaust gas is lowered in a catalytic reaction taking place in the second catalytic converter unit 28.

A first muffler unit 32, which is to be designated, for example, as a middle muffler, may be provided downstream of the second catalytic converter unit 28. A second muffler unit 34, which is to be designated as a rear muffler or an end muffler, may be arranged downstream of the first muffler unit 32.

The exhaust system 10 further comprises a fuel-operated heater, which is generally designated by 36. The heater 36 may be used in a vehicle both as a parking heater or/and as an auxiliary heater, on the one hand, to thermally treat a vehicle interior or the internal combustion engine 15, for example, before start-up of a vehicle, and, on the other hand, to additionally also provide heat to the internal combustion engine 15 during the operation, if this is necessary for a sufficient heating of a vehicle interior.

Combustion air L is fed into a combustion chamber 40 of the heater 36 by means of a combustion air blower 38, for example, a side channel blower, which can be actuated to feed a quantity of air necessary for a particular operation. Liquid fuel is generally introduced into the combustion chamber 40 by means of a fuel feed device, for example, a feed pump, which is shown by a flow arrow for fuel B and which can be actuated to feed a quantity of fuel necessary for a particular operation. When configured as a vaporizing burner, a porous evaporator medium can absorb the liquid fuel and discharge the fuel in vapor form into the combustion chamber 40, where the fuel vapor is blended with combustion air L. In case combustion is taking place in the combustion chamber 40, heater exhaust gas forms, which flows through a heater exchanger unit, generally designated by 42, downstream of the combustion chamber 40, in a heat exchanger flow space 44. Heat carrier medium to be heated, for example, a liquid, flows through a heat carrier medium flow space 46. In this connection, the heater exhaust gas flowing through the heat exchanger flow space 44 transmits heat to the heat carrier medium flowing in the heat carrier medium flow space 46, so that this heat carrier medium is heated in the heat exchanger unit 42.

A heater exhaust gas catalytic converter device 48, for example, likewise an oxidation catalytic converter device, is provided in an area of the heat exchanger flow space 44 positioned essentially downstream of the thermal interaction of the heater exhaust gas with the heat carrier medium. The heater exhaust gas leaves the heater 36 with reduced content of harmful substances downstream of the heater exhaust gas catalytic converter device 48.

A heat exchanger volume, which is generally designated by 50, is provided in association with the first catalytic converter unit 18, enclosing the housing 20 of same or integrated into same. The heat exchanger volume 50 is closed, for example, inwardly, i.e., in the direction towards the internal combustion engine exhaust gas flow space 22, by the housing 20 of the first catalytic converter unit 18 and is closed outwardly by a wall 52 enclosing the housing 20, so that a heater exhaust gas flow space 54 enclosing the internal combustion engine exhaust gas flow space 20 essentially over an entire length of the first catalytic converter unit 18 and over the entire circumference of the housing 20 is formed between the housing 20 and the wall 52. Heater exhaust gas leaving the heater 36 enters an upstream end area of the heater exhaust gas flow space 54, flows along the outer side of the housing 20, preferably distributed over the entire circumference of same, in the direction towards a downstream end area of the heater exhaust gas flow space 54 and leaves this there via a heater exhaust gas line 56. Via the heater exhaust gas line 56, heater exhaust gas leaving the heater exhaust gas flow space 54 flows to an area 58 of the exhaust gas line 14, which is in an internal combustion engine exhaust gas flow direction between the first muffler unit 32 and the second muffler unit 34.

If the heater 36 is operated during the combustion operation, generally only some of the heat transported in the heater exhaust gas is transmitted to the heat carrier medium flowing through the heat carrier medium flow space 46. The heater exhaust gas leaves the heat exchanger flow space 44 or the heater 36 generally with a temperature in the range of about 200° C. This comparatively hot heater exhaust gas flows around the housing 20 of the first catalytic converter unit 18 and thus also the catalytic converter device 24 mounted therein or even the particle filter device 26. In this connection, the first catalytic converter unit 18 is heated and thermally treated such that the catalytic reaction can be started and thus the content of harmful substances, especially the CO content, can be lowered without a considerable time delay when the internal combustion engine 15 is started up. If the internal combustion engine 15 was put into operation already before or with start-up of the heater 36, the time, up to which the catalytic converter device 24 reaches a catalytic converter operating temperature, is markedly lowered due to the additional operation of the heater 36, so that the time, during which an efficient reduction of harmful substances will not take place in the first catalytic converter unit 18, is shortened markedly.

In order to further increase the temperature of the heater exhaust gas leaving the heater 36, the heater 36 may be operated hypostoichiometrically during the combustion operation, i.e., with a rich mixture of fuel B and combustion air L. The fuel or hydrocarbon content not burned because of the oxygen deficiency flows through the heat exchanger flow space 44 and is converted into carbon dioxide and water in an exothermal reaction at the heater exhaust gas catalytic converter device 48.

During the hypostoichiometric combustion operation, an essentially oxygen-free mixture of unburned fuel and combustion exhaust gas flows to the heater exhaust gas catalytic converter device 48. The fuel contained therein is temporarily stored in the heater exhaust gas catalytic converter device 48, which is also active as a fuel storage device. In a following phase with hyperstoichiometric combustion operation, the excess oxygen is reacted with the temporarily stored fuel at the heater exhaust gas catalytic converter unit 48 and the heat developing thereby is transmitted to the exhaust gas flowing to the heat exchanger volume 50.

In case of alternating hyperstoichiometric combustion operation and hypostoichiometric combustion operation, it can thus be ensured that some of the fuel first reacts in the heater exhaust gas catalytic converter device 48 and the heat released in this connection can be used at least for the most part for heating the catalytic converter unit 18.

In an alternative approach, for example, when only a minimal quantity of heat is needed for heating a vehicle interior, the combustion can be ended in the combustion chamber 40 by increasing the quantity of combustion air or/and reducing the quantity of fuel and a hyperstoichiometric mixture of air and fuel can be sent to the heater exhaust gas catalytic converter device 48. This mixture ignites and reacts at the then hot heater exhaust gas catalytic converter device 48. The heat released in this connection is transmitted only to a lesser extent to the heat carrier medium flowing in the heat carrier medium flow space 46, but can for the most part be used in the heat exchanger volume 50 for heating the catalytic converter unit 18.

Due to the heat being released in this connection, the heater exhaust gas catalytic converter device 48 is additionally heated, wherein at least some of this heat is absorbed by the heater exhaust gas flowing around or flowing through this heater exhaust gas catalytic converter device. As a result, the temperature of the heater exhaust gas leaving the heater 36 can be raised to markedly above 200° C., e.g., up to in a range of about 300° C., during combustion taking place in the heater 36 due to the fuel excess and the catalytic reaction in the area of the heater exhaust gas catalytic converter device 48. The first catalytic converter unit 18 can thus also be heated markedly more rapidly.

The temperature of the heater exhaust gas leaving the heater 36 may also be influenced significantly as a result by the extent to which the heat carrier medium flowing through the heater carrier medium flow space 46 can absorb heat. If this is mostly prevented, a considerable part of the heat developing during the combustion and transported in the heater exhaust gas shall thus be available for heating the first catalytic converter unit 18, a circulation of heat carrier medium through the heat carrier medium flow space 46 can, for example, be mostly prevented or be significantly reduced such that it is ensured that an overheating of the heater 36 is prevented, but a considerable dissipation of heat via the heat carrier medium does not take place. For example, the heat output of the heater 36 may also be set in this connection such that an overheating of same is avoided.

As already explained, after flowing through the heater exhaust gas flow space 54, the heater exhaust gas is introduced into the exhaust gas line 14 in an area that is close to the downstream end area 16 thereof exhaust gas line, but still upstream of the last muffler unit, i.e., the second muffler unit 34 in the internal combustion exhaust gas flow direction. Efficient muffling of the noises developing in the heater 36 during the combustion operation and transported via the heater exhaust gas is thus also guaranteed without an additional or separate muffler having to be provided for the heater 36. On the other hand, introduction of the heater exhaust gas thus takes place in an area of the exhaust gas line 14 located comparatively far downstream, where the prevailing internal combustion engine exhaust gas pressure is comparatively low. The introduction of heater exhaust gas can be supported in this area because of the suction action developing due to the internal combustion engine exhaust gas flow.

This effect can especially also be used when the heater 36 is not being operated during the heating operation, i.e., no combustion is taking place in the combustion chamber 40. This is a state, in which, for example, because of one or more sensor units associated with the first catalytic converter unit 18 or/and by calculation, it was determined that, for example, the catalytic converter device 24 has a sufficiently high temperature, so that an additional input of heat through heater exhaust gas flowing around the housing 20 is not necessary. Because of the above-mentioned suction action in that area, in which the heater exhaust gas line 56 is open towards the exhaust gas line 14, air is suctioned through the heater 36 and through the heater exhaust gas flow space 54 as well, so that basically heat can be discharged from the area of the first catalytic converter unit 18. This guarantees that overheating of the first catalytic converter unit 18 can be avoided especially when the internal combustion engine is operated in a state of high load for a longer time. In order to support this effect even more, the heater 36 may also be operated such that when the fuel feed is switched off, only the combustion air feed device 38, i.e., for example, a side channel blower, is operated in order to feed air through the heater 36 and into the heater exhaust gas flow space 54. A comparatively strong air stream can thus be actively ensured, which contributes to the dissipation of heat from the first catalytic converter unit. The strength of this air stream may be influenced, for example, by setting the speed of the feed wheel of the combustion air feed device 38.

Due to the configuration of an exhaust system for an internal combustion engine according to the present invention, it is possible to bring a catalytic converter unit to the temperature necessary for carrying out an efficient catalytic reaction more rapidly and essentially also independently of the operation of an internal combustion engine. Since the heat necessary for this is provided by a fuel-operated heater, an excessive load of the vehicle electrical system can be avoided and thus also a greater range of a hybrid vehicle can be guaranteed in the electric drive mode. Since a parking heater or an auxiliary heater is generally installed in modern motor vehicles, it is only necessary to adapt the exhaust gas guiding thereof. The muffler generally to be provided in such a fuel-operated vehicle heater may also be omitted because a muffler unit of the exhaust system can take over the function thereof. Since at least small quantities of liquid may also generally be stored temporarily in such a muffler unit, dripping of condensation from the area of the lines guiding the heater exhaust gas can thus also be avoided.

Finally, it should be noted that the principles of the present invention may, of course, also apply when the exhaust system 10, for example, also the heater 36 of same, is configured differently than shown. Thus, for example, the heater 36 may also be an air heater, with which air to be introduced into the vehicle interior is heated directly as a heat carrier medium. It is obvious as well that the configuration of the heater 36 in FIG. 1 is shown only basically and schematically. After flowing through a Y-pipe, the heater exhaust gas leaving the combustion chamber 40 can, for example, at first be deflected by about 180° in order to then flow through a heater exchanger flow space 44 guided along on the outer side of the Y-pipe in the direction towards the combustion chamber 40 and also to transmit heat towards the heat carrier medium. Depending on the thermal requirements, the heater exhaust gas catalytic converter device 48 could also be arranged further upstream, i.e., further in the area of the thermal interaction with the heat carrier medium, in order to be able to use the heat additionally generated by the heater exhaust gas catalytic converter device 48 during the hypostoichiometric operation as well or reinforced for heating the heat carrier medium.

FIG. 1 also shows a control unit C and a sensor S. The control unit C comprises one or more processors and one or more memory unit (memory). With one or more such sensors S and the control unit C, the exhaust system 10 and the method according to the present invention can provide for the heater 36 to be operated in a catalytic converter unit temperature control mode. This involves sensing a temperature with one or more sensors S. With the control unit C, the temperature values detected by the one or more sensors S are compared with threshold temperatures, saved in memory of the control unit C. An advantageous placement of the temperature sensor S is shown in FIG. 1, with the sensor S positioned adjacent to the catalytic converter device 24. Other positions of the sensor S may be provided or multiple sensors S may be provided. The sensors S may be positioned adjacent to the particle filter 26 or at the housing 20, containing a catalytic converter device 24 or the particle filter 26, in order to detect the temperature of these system areas to be monitored via a control unit C. The temperature of the internal combustion engine exhaust gas leaving the internal combustion engine is additionally detected with the sensor S directly before or directly after a catalytic converter device. Based on this temperature, the temperature of a catalytic converter device 24 or/and the temperature of a housing 20 containing or carrying the catalytic converter device 24 can be inferred by the control unit. The temperatures present in the area of a catalytic converter unit, especially of the catalytic converter device 24 or of a housing 20 of same, are according to one embodiment inferred with computer models, for example, by taking into account the load state of an internal combustion engine and of the thermal behavior of an exhaust system, using the control unit C with the memory (with one or more stored computer model) and with information coming via a connection to the engine (for load state data). The catalytic converter unit temperature control mode considers if at least the temperature in the area of the at least one first catalytic converter unit 24, as detected by the sensor S, is below a first threshold temperature stored in the memory of the control unit C. This first threshold temperature may be, for example, in a range of 150° C. to 200° C. If the temperature in the area of the at least one first catalytic converter unit 24 is below the first threshold temperature, the fuel operated heater 38 is operated in a combustion operation, generating heater exhaust gas, which flows through the heat exchanger volume 50. In a further aspect of the catalytic converter unit temperature control mode, if at least one temperature in the area of the at least one first catalytic converter unit 24 is above a second threshold temperature, an air feed operation is initiated by the control unit C signaling the fuel operated heater 38 to generate an air stream flowing through the heat exchanger volume 50. By feeding air through the heater 38, which is not operated during with a combustion operation, the air then also flows through the heater exchanger volume 50 of the at least one first catalytic converter unit 24. With this heat can be removed and discharged to the outside especially when there is a risk of a thermal overload of this catalytic converter unit. The second threshold temperature may be in a range of 500° C. to 600° C.

It should also be noted that a plurality of first catalytic converter units 18, i.e., catalytic converter units to be heated by the heater exhaust gas, or/and a plurality of second catalytic converter units 28, i.e., catalytic converter units not to be additionally heated by the heater exhaust gas, may also be provided in such an exhaust system 10. At least one of such first catalytic converter units 18 could also be configured, for example, as an SCR catalytic converter unit. Further, to avoid heat losses, the exhaust system 10 may be thermally insulated by enclosing it with insulation material especially in the thermally critical areas, for example, in the area of the catalytic converter units.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, the exhaust system comprising:
    at least one catalytic converter unit with at least one catalytic converter device through which internal combustion engine exhaust gas flows and the at least one catalytic converter unit comprising a heat exchanger volume; and
    a fuel-operated heater with an operative connection between a heater exhaust of the fuel-operated heater and the heat exchanger volume, whereby heater exhaust gas leaving the heater flows through the heat exchanger volume, the at least one catalytic converter unit comprising an internal combustion engine exhaust gas flow space through which internal combustion engine exhaust gas flows, the at least one catalytic converter device being arranged in the internal combustion engine exhaust gas flow space, the heat exchanger volume comprising a heater exhaust gas flow space enclosing the internal combustion engine exhaust gas flow space at least in a length area of the internal combustion engine exhaust gas flow space containing the at least one catalytic converter device.

2. The exhaust system in accordance with claim 1, wherein the heater exhaust gas flow space extends over an entire circumference of the internal combustion engine exhaust gas flow space.

3. The exhaust system in accordance with claim 1, wherein at least one catalytic converter device of the at least one catalytic converter unit is an oxidation catalytic converter device.

4. The exhaust system in accordance with claim 1, wherein the at least one catalytic converter unit comprises at least one particle filter device which is arranged downstream of the at least one catalytic converter device.

5. The exhaust system in accordance with claim 4, wherein:
    the at least one catalytic converter unit comprises an internal combustion engine exhaust gas flow space through which internal combustion engine exhaust gas flows;
    the heater exhaust gas flow space encloses a length area of the internal combustion engine exhaust gas flow space, which length area contains the at least one particle filter device, over an entire circumference of the internal combustion engine exhaust gas flow space.

6. The exhaust system in accordance with claim 1, wherein at least one catalytic converter unit is at least one first catalytic converter unit and further comprising at least one second catalytic converter unit provided in an internal combustion engine exhaust gas flow direction downstream of the at least one first catalytic converter unit, and the at least one second catalytic converter unit is an SCR catalytic converter unit.

7. The exhaust system in accordance with claim 1, further comprising:
    at least one muffler unit connected to the at least one catalytic converter unit in an internal combustion engine exhaust gas flow direction downstream of the at least one catalytic converter unit, wherein heater exhaust gas flowing through the heat exchanger volume is introduced into the internal combustion engine exhaust gas stream in the internal combustion engine exhaust gas flow direction upstream of at least one muffler unit.

8. The exhaust system in accordance with claim 7, further comprising at least another muffler unit wherein a plurality of muffler units following one another in an internal combustion engine exhaust gas flow direction, and that the heater exhaust gas is introduced into the internal combustion exhaust gas stream between a last muffler unit in the internal combustion engine exhaust gas flow direction and a next-to-last muffler unit in the internal combustion engine exhaust gas flow direction.

9. The exhaust system in accordance with claim 1, wherein the fuel-operated heater comprises:
    a combustion air feed device for feeding combustion air into a combustion chamber;
    a fuel feed device for feeding fuel into the combustion chamber; and
    a heat exchanger unit through which heater exhaust gas and heat exchanger medium to be heated can flow.

10. The exhaust system in accordance with claim 9, further comprising a heater exhaust gas catalytic converter device, through which heater exhaust flows.

11. The exhaust system in accordance with claim 10, wherein the heater exhaust gas catalytic converter device is arranged in a heater exhaust gas flow direction essentially downstream of the heat exchanger unit.

12. The exhaust system in accordance with claim 1, wherein the at least one catalytic converter unit comprises a housing and an outer wall, the outer wall surrounding at least a portion of the housing, the housing comprising an outer housing surface and an inner housing surface, the outer wall comprising an outer wall inner surface, the outer wall inner surface and the outer housing surface defining at least a portion of the heater exhaust gas flow space, the inner housing surface defining at least a portion of the internal combustion engine exhaust gas flow space.

13. A method for operating an exhaust system, the method comprising:
    providing an exhaust system for an internal combustion engine, the exhaust system comprising:
        at least one catalytic converter unit with at least one catalytic converter device through which internal combustion engine exhaust gas flows, the at least one catalytic converter unit comprising an internal combustion engine exhaust gas flow space through which internal combustion engine exhaust gas flows, the at least one catalytic converter device being arranged in the internal combustion engine exhaust gas flow space;
        a heat exchanger volume; and
        a fuel-operated heater with an operative connection between a heater exhaust of the fuel-operated heater and the heat exchanger volume, wherein heater exhaust gas leaving the heater flows through the heat exchanger volume, the heat exchanger volume comprising a heater exhaust gas flow space enclosing the internal combustion engine exhaust gas flow space at least in a length area of the internal combustion engine exhaust gas flow space containing the at least one catalytic converter device;

operating the fuel operated heater in a catalytic converter unit temperature control mode at least if a temperature in the area of the at least one first catalytic converter unit is below a first threshold temperature in a combustion operation generating heater exhaust gas flowing through the heat exchanger volume.

14. The method in accordance with claim 13, further comprising:

providing a heater exhaust gas catalytic converter device, through which heater exhaust flows;

arranging the heater exhaust gas catalytic converter device in a heater exhaust gas flow direction essentially downstream of the heat exchanger unit;

operating the heater at least some times with a hypostoichiometric fuel/combustion air mixture in the combustion operation.

15. The method in accordance with claim 14, wherein the heater is alternatingly operated with a hypostoichiometric fuel/combustion air mixture and a hyperstoichiometric fuel/combustion air mixture.

16. The method in accordance with claim 13, wherein the heater is operated at least some times with a hyperstoichiometric fuel/combustion air mixture after the combustion has ended.

17. The method in accordance with claim 13, wherein the heater is operated in a catalytic converter unit temperature control mode at least if the temperature in the area of the at least one first catalytic converter unit is above a second threshold temperature in an air feed operation for generating an air stream flowing through the heat exchanger volume.

18. A drive system for a vehicle, the drive system comprising:

an internal combustion engine; and an exhaust system comprising:

at least one catalytic converter unit with at least one catalytic converter device through which internal combustion engine exhaust gas flows;

a heat exchanger volume; and a fuel-operated heater with an operative connection between a heater exhaust of the fuel-operated heater and the heat exchanger volume, whereby heater exhaust gas leaving the heater flows through the heat exchanger volume, the at least one catalytic converter unit comprising an internal combustion engine exhaust gas flow space through which internal combustion engine exhaust gas flows, the at least one catalytic converter device being arranged in the internal combustion engine exhaust gas flow space, the heat exchanger volume comprising a heater exhaust gas flow space enclosing the internal combustion engine exhaust gas flow space at least in a length area of the internal combustion engine exhaust gas flow space containing the at least one catalytic converter device.

19. The drive system in accordance with claim 18, wherein:

the heater exhaust gas flow space extends over at least a portion of a circumference of the internal combustion engine exhaust gas flow space.

20. The drive system in accordance with claim 19, wherein the fuel-operated heater comprises:

a combustion air feed device for feeding combustion air into a combustion chamber;

a fuel feed device for feeding fuel into the combustion chamber; and a heat exchanger unit through which heater exhaust gas and heat exchanger medium to be heated can flow.

* * * * *